United States Patent
Martz et al.

(10) Patent No.: US 11,552,987 B2
(45) Date of Patent: *Jan. 10, 2023

(54) SYSTEMS AND METHODS FOR COMMAND AND CONTROL PROTECTION

(71) Applicant: L3 Technologies, Inc., New York, NY (US)

(72) Inventors: Peter Martz, Marlton, NJ (US); Kenneth Moritz, Lansdowne, PA (US); Glenn Coleman, Berwyn, PA (US)

(73) Assignee: L3 Technologies, Inc., New York, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/146,490

(22) Filed: Sep. 28, 2018

(65) Prior Publication Data

US 2019/0098020 A1    Mar. 28, 2019

Related U.S. Application Data

(60) Provisional application No. 62/564,927, filed on Sep. 28, 2017.

(51) Int. Cl.
    *H04L 9/40*    (2022.01)
(52) U.S. Cl.
    CPC ........ *H04L 63/145* (2013.01); *H04L 63/0245* (2013.01); *H04L 63/083* (2013.01)
(58) Field of Classification Search
    USPC .......................................................... 726/13
    See application file for complete search history.

(56) References Cited

U.S. PATENT DOCUMENTS

| 7,150,040 B2 | 12/2006 | Brownell |
| 7,467,408 B1 | 12/2008 | Otoole, Jr. |

(Continued)

FOREIGN PATENT DOCUMENTS

RU    2406138 C1    12/2010

OTHER PUBLICATIONS

Barnet, Mark, "Praktikum Po Zaschite Seti Kompanii", Windows IT Pro/RE, Nov.-Dec. 2006, pp. 79-81.

(Continued)

*Primary Examiner* — Sakinah White Taylor
(74) *Attorney, Agent, or Firm* — Condo Roccia Koptiw LLP

(57) ABSTRACT

A host computer system may be configured to connect to a network. The host computer system may be configured to implement a workspace and an isolated computing environment. The host computer system may be configured to isolate the isolated computing environment from the workspace using an internal isolation firewall. The internal isolation firewall may be configured to prevent data from being communicated between the isolated computing environment and the workspace, for example, without an explicit user input. The host computer system may be configured to implement one or more mechanisms that prevent malware received by the host computer system from receiving external communications from an external source. The one or more mechanisms may be configured to prevent control of the malware by the external source. The one or more mechanisms may be configured to prevent the malware from establishing a command channel with the external source.

8 Claims, 5 Drawing Sheets

(56) References Cited

U.S. PATENT DOCUMENTS

| | | |
|---|---|---|
| 7,478,330 B1 | 1/2009 | Branson et al. |
| 7,694,328 B2 | 4/2010 | Joshi et al. |
| 7,698,442 B1 | 4/2010 | Krishnamurthy et al. |
| 7,716,720 B1 | 5/2010 | Marek et al. |
| 7,805,516 B2 | 9/2010 | Kettler et al. |
| 7,870,153 B2 | 1/2011 | Croft et al. |
| 7,926,086 B1 | 4/2011 | Violleau et al. |
| 7,954,150 B2* | 5/2011 | Croft ............... H04L 67/08 726/21 |
| 7,970,923 B2* | 6/2011 | Pedersen ........... H04L 67/568 709/219 |
| 8,090,797 B2 | 1/2012 | Chinta et al. |
| 8,539,561 B2 | 9/2013 | Pingali et al. |
| 8,566,398 B2 | 10/2013 | Barnier et al. |
| 8,613,070 B1 | 12/2013 | Borzycki et al. |
| 8,769,268 B2* | 7/2014 | Morozov ............... G06F 21/74 718/107 |
| 8,832,833 B2* | 9/2014 | Demopoulos ....... H04L 63/0209 726/23 |
| 8,931,054 B2 | 1/2015 | Huynh et al. |
| 8,966,464 B1 | 2/2015 | Christopher et al. |
| 9,294,492 B1 | 3/2016 | Martini et al. |
| 9,386,021 B1 | 7/2016 | Pratt |
| 9,438,634 B1 | 9/2016 | Ross et al. |
| 9,465,734 B1 | 10/2016 | Myrick et al. |
| 9,531,715 B1 | 12/2016 | Rodgers et al. |
| 9,560,081 B1 | 1/2017 | Woolward |
| 9,602,524 B2 | 3/2017 | Ghosh et al. |
| 9,609,026 B2 | 3/2017 | Ross et al. |
| 9,680,873 B1 | 6/2017 | Halls et al. |
| 9,729,579 B1 | 8/2017 | Marino et al. |
| 9,787,639 B1 | 10/2017 | Sun et al. |
| 9,864,600 B2 | 1/2018 | Larimore et al. |
| 9,921,860 B1 | 3/2018 | Banga et al. |
| 9,942,198 B2 | 4/2018 | Hoy et al. |
| 10,037,199 B2 | 7/2018 | Hung et al. |
| 10,055,231 B1 | 8/2018 | Li et al. |
| 10,104,120 B2* | 10/2018 | Gopalakrishna .... H04L 63/1491 |
| 10,122,703 B2 | 11/2018 | Innes et al. |
| 10,375,111 B2 | 8/2019 | Schultz et al. |
| 10,397,273 B1 | 8/2019 | Stickle et al. |
| 10,521,612 B2 | 12/2019 | Arad et al. |
| 10,554,475 B2 | 2/2020 | Weinstein et al. |
| 10,558,798 B2 | 2/2020 | Weinstein et al. |
| 10,873,589 B2 | 12/2020 | Cheetancheri et al. |
| 10,931,669 B2 | 2/2021 | Coleman et al. |
| 2002/0023212 A1 | 2/2002 | Proudler |
| 2002/0040439 A1 | 4/2002 | Kellum |
| 2002/0069366 A1 | 6/2002 | Schoettger |
| 2002/0069369 A1 | 6/2002 | Tremain et al. |
| 2004/0249938 A1* | 12/2004 | Bunch ............... H04L 63/0245 709/224 |
| 2005/0144467 A1 | 6/2005 | Yamazaki |
| 2006/0070066 A1 | 3/2006 | Grobman |
| 2006/0282795 A1 | 12/2006 | Clark et al. |
| 2007/0136579 A1 | 6/2007 | Levy et al. |
| 2007/0220187 A1 | 9/2007 | Kates |
| 2007/0260873 A1 | 11/2007 | Hatfalvi et al. |
| 2008/0016313 A1 | 1/2008 | Murotake et al. |
| 2008/0028401 A1 | 1/2008 | Geisinger |
| 2008/0201711 A1 | 8/2008 | Amir Husain |
| 2008/0256536 A1 | 10/2008 | Zhao et al. |
| 2009/0055924 A1 | 2/2009 | Trotter |
| 2009/0164994 A1 | 6/2009 | Vasilevsky et al. |
| 2009/0172781 A1 | 7/2009 | Masuoka et al. |
| 2009/0249472 A1 | 10/2009 | Benjamini et al. |
| 2009/0265760 A1 | 10/2009 | Zhu et al. |
| 2009/0328038 A1 | 12/2009 | Yamada et al. |
| 2010/0138829 A1 | 6/2010 | Hanquez et al. |
| 2010/0138830 A1 | 6/2010 | Astete et al. |
| 2010/0217916 A1 | 8/2010 | Gao et al. |
| 2010/0223613 A1 | 9/2010 | Schneider |
| 2010/0251329 A1 | 9/2010 | Wei |
| 2011/0154431 A1 | 6/2011 | Walsh |
| 2011/0299515 A1* | 12/2011 | Robertson ......... H04W 12/0602 370/338 |
| 2012/0017213 A1 | 1/2012 | Hunt et al. |
| 2012/0023593 A1 | 1/2012 | Puder et al. |
| 2012/0054744 A1 | 3/2012 | Singh et al. |
| 2012/0265976 A1 | 10/2012 | Spiers et al. |
| 2012/0266149 A1 | 10/2012 | Lebert |
| 2013/0132948 A1 | 5/2013 | Hari et al. |
| 2013/0145463 A1 | 6/2013 | Ghosh et al. |
| 2013/0318594 A1 | 11/2013 | Hoy et al. |
| 2014/0040979 A1 | 2/2014 | Barton et al. |
| 2014/0059642 A1 | 2/2014 | Deasy et al. |
| 2014/0075535 A1* | 3/2014 | Soffer ................. H04L 63/0227 726/13 |
| 2014/0108558 A1 | 4/2014 | Borzycki et al. |
| 2014/0115646 A1 | 4/2014 | Rajgopal et al. |
| 2014/0215621 A1* | 7/2014 | Xaypanya ............. H04L 63/145 726/23 |
| 2014/0282890 A1 | 9/2014 | Li et al. |
| 2014/0310810 A1 | 10/2014 | Brueckner et al. |
| 2014/0344912 A1 | 11/2014 | Chapman, Ii et al. |
| 2014/0351516 A1 | 11/2014 | Larimore et al. |
| 2014/0380403 A1 | 12/2014 | Pearson et al. |
| 2014/0380412 A1* | 12/2014 | Fitzgerald ............. G06F 21/577 718/1 |
| 2015/0058923 A1 | 2/2015 | Rajagopal et al. |
| 2015/0106822 A1 | 4/2015 | Lei |
| 2015/0143374 A1 | 5/2015 | Banga et al. |
| 2015/0156203 A1 | 6/2015 | Giura et al. |
| 2015/0161277 A1 | 6/2015 | Heller et al. |
| 2015/0248554 A1 | 9/2015 | Dumitru et al. |
| 2015/0281176 A1 | 10/2015 | Banfield |
| 2016/0057167 A1 | 2/2016 | Bach |
| 2016/0134549 A1 | 5/2016 | Abel et al. |
| 2016/0154539 A1 | 6/2016 | Buddhiraja et al. |
| 2016/0226834 A1 | 8/2016 | Dawson |
| 2016/0246974 A1 | 8/2016 | Broz et al. |
| 2016/0248754 A1* | 8/2016 | Jahr ....................... H04L 67/02 |
| 2016/0292694 A1 | 10/2016 | Goldschlag et al. |
| 2016/0308895 A1* | 10/2016 | Kotler ................... G06F 21/577 |
| 2017/0034174 A1 | 2/2017 | Jägers |
| 2017/0041338 A1* | 2/2017 | Martini ............... H04L 63/1441 |
| 2017/0076092 A1 | 3/2017 | Kashyap et al. |
| 2017/0142144 A1* | 5/2017 | Weinberger ......... H04L 63/0236 |
| 2017/0180413 A1 | 6/2017 | Petry et al. |
| 2017/0206351 A1 | 7/2017 | Jay et al. |
| 2017/0208067 A1 | 7/2017 | Sriramakrishnan |
| 2017/0250997 A1 | 8/2017 | Rostamabadi et al. |
| 2017/0293432 A1 | 10/2017 | Oldcorn et al. |
| 2017/0317978 A1 | 11/2017 | Diaz-cuellar et al. |
| 2017/0353496 A1* | 12/2017 | Pai ....................... H04L 63/1441 |
| 2017/0359309 A1 | 12/2017 | Bolte et al. |
| 2018/0027006 A1 | 1/2018 | Zimmermann et al. |
| 2018/0115519 A1 | 4/2018 | Bonomi et al. |
| 2018/0139178 A1 | 5/2018 | Gan |
| 2018/0196945 A1 | 7/2018 | Kornegay et al. |
| 2018/0198824 A1 | 7/2018 | Pulapaka et al. |
| 2018/0203995 A1 | 7/2018 | Yuen et al. |
| 2018/0234422 A1 | 8/2018 | Odom et al. |
| 2018/0276396 A1 | 9/2018 | Yablokov et al. |
| 2018/0330257 A1 | 11/2018 | Dodson et al. |
| 2018/0367528 A1 | 12/2018 | Schwarz et al. |
| 2019/0097970 A1 | 3/2019 | Coleman et al. |
| 2019/0097972 A1 | 3/2019 | Coleman et al. |
| 2019/0098007 A1 | 3/2019 | Coleman et al. |
| 2019/0098020 A1 | 3/2019 | Martz et al. |
| 2019/0121961 A1 | 4/2019 | Coleman et al. |
| 2019/0121962 A1 | 4/2019 | Coleman et al. |
| 2019/0213325 A1 | 7/2019 | Mckerchar et al. |

OTHER PUBLICATIONS

Burnett, Mark, "How I Secured One Company's Network", Using Log Parser, Virtualization, and A Little Psychology, Sep. 17, 2006, 4 pages.

Laverick, Mike, "Hypervisor Management and Optimization for Advanced Virtualization", E-book, TechTarget, 2010, 13 pages.

(56) References Cited

OTHER PUBLICATIONS

Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at <https://en.wikipedia.org/wiki/Hypervisor>, retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at <https://en.wikipedia.org/wiki/Multiprotocol_Label_Switching>, retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
"NPL Search Term", Web Search History, 1 page.
Azab, et al., "SICE: A Hardware-Level Strongly Isolated Computing Environment for x86 Multi-Core Platforms", Proceedings of the 18th ACM Conference on Computer and Communications Security, Oct. 2011, pp. 375-388.
Bruckman, et al., ""Georgia Computes!": Improving the Computing Education Pipeline", Proceeding of the 40th ACM Technical Symposium on Computer Science Education, 2009, pp. 86-90.
Comodo, "Comodo Internet Security", Software Version 7.0, User Guide Version 7.0.111114, 2014, pp. 1-579.
Gupta, et al., "A Secure Architecture Design Based on Application Isolation, Code Minimization and Randomization", IEEE 6th Symposium on Security Analytics and Automation 2013, 2013, pp. 423-429.
Haq, et al., "Design and Implementation of Sandbox Technique for Isolated Applications", IEEE School of Computer Science and Technology, Beijing Institute of Technology, Beijing, China, 2016, pp. 557-561.
Hsu, et al., "Enforcing Least Privilege Memory Views for Multithreaded Applications", Proceedings of the 2016 ACM SIGSAC Conference on Computer and Communications Security, Oct. 2016, pp. 393-405.
Jauernig, et al., "Trusted Execution Environments: Properties, Applications, and Challenges", IEEE Computer and Reliability Societies, Resilient Security, Mar.-Apr. 2020, pp. 56-60.
Jung, et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen, et al., "Dedicated Security Chips in the Age of Secure Enclaves", IEEE Computer and Reliability Societies; Hardware-Assisted Security, Sep.-Oct. 2020, pp. 38-46.
Le, et al., "Computing the Real Isolated Points of an Algebraic Hypersurface", International Symposium on Symbolic and Algebraic Computation, Aug. 24, 2020, 12 pages.
Liu, et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava, et al., "Tamper-Resistant, Application-Aware Blocking of Malicious Network Connections", School of Computer Science, Georgia Institute of Technology, 2008, pp. 39-58.
Yadav, et al., "Impact & Analysis of Virtual Workspace on Grid Computing", International Journal of Science & Technology (IJST), vol. 2, Issue 2, Apr. 2012, pp. 24-32.
Yee, et al., "Native Client: A Sandbox for Portable, Untrusted x86 Native Code", 2009 30th IEEE Symposium on Security and Privacy, 2009, pp. 79-93.
Chen, Yaohui et al., "Shreds: Fine-Grained Execution Units", 2016 IEEE Symposium on Security and Privacy, 2016, pp. 1-16.
Evtyushkin, Dmitry et al., "ISO-X: A Flexible Architecture for Hardware-Managed Isolated Execution", 2014 47th Annual IEEE/ACM International Symposium on Microarchitecture, 2014, pp. 1-13.
Mambretti, Andrea et al., "Trellis: Privilege Separation for Multi-User Applications Made Easy", 2016, pp. 1-20.

\* cited by examiner

SYSTEMS AND METHODS FOR COMMAND AND CONTROL PROTECTION

CROSS-REFERENCE TO RELATED APPLICATIONS

This application claims the benefit of U.S. Provisional Patent Application No. 62/564,927, filed Sep. 28, 2017, the contents of which is hereby incorporated by reference in its entirety.

BACKGROUND

Computer systems are designed to execute software applications and processes. While most of these applications are innocuous, some applications, traditionally referred to as malware, are harmful. These malware applications compromise computer systems and render them unsafe for use. The malware applications may even attempt to exfiltrate sensitive information, destroy sensitive data, hold data hostage, spread itself, or perform any number of other malicious activities. Many existing solutions to preventing malware, such as hardware-based firewalls, attempt to block the malware from ever reaching the computing systems that reside behind the firewalls. Elaborate defensive protections are implemented which are often costly and difficult to maintain. Unfortunately, even with these defensive systems in place, malware applications still reach the computer systems and networks lying behind the implemented defensive protections.

SUMMARY

Methods and systems are disclosed for preventing malware from contacting a command and control server while still providing an authorized user of computing devices access to untrusted devices, such as those available via the internet. The host computer system may include a memory and a processor. The processor may be configured to implement a workspace and an isolated computing environment. The workspace may be configured to enable operation of a first set of one or more applications or processes via a first memory space. The isolated computing environment may be configured to enable operation of a second set of one or more applications or processes via a second memory space. The isolated computing environment may be configured to authenticate with an authorization device. The isolated computing environment may be a sandboxed computing environment enforced by a sandbox container process that enables the internal isolation firewall. The processor may be configured to isolate the isolated computing environment from the workspace using an internal isolation firewall. The internal isolation firewall may be configured to prevent data from being communicated between the isolated computing environment and the workspace, for example, without an explicit user input.

The processor may be configured to implement one or more mechanisms that prevent malware received by the host computer system from receiving external communications from an external source, the one or more mechanisms configured to prevent control of the malware by the external source. The external communications may include instructions to gather data, instructions to exfiltrate data, instructions to destroy data, instructions to encrypt data, instructions to download additional malware, and/or instructions to execute the additional malware. The one or more mechanisms may be configured to prevent the malware from establishing a command channel with the external source. The one or more mechanisms may include a host-based firewall. When the host computer system is connected to a trusted network, the host-based firewall may be configured to block incoming traffic from other devices on the trusted network. When the host computer system is connected to an untrusted network, the host-based firewall may be configured to block outgoing traffic from and incoming traffic to the workspace of the host computer system. The one or more mechanisms may include the processor being configured to communicate through one or more of a border firewall or a proxy device. When the host computer system is connected to the trusted network, the external communications from the external source to the malware may be prevented by the border firewall and/or the proxy device. When the host computer system is connected to the untrusted network, the external communications from the external source to the malware may be prevented by the host-based firewall.

When malware is received by the workspace, the internal isolation firewall may be configured to prevent the malware from communicating with the external source via the isolated computing environment. The processor may be configured to terminate a browser process operating in the isolated computing environment upon expiration of a predetermined amount of time without receiving or sending data. The processor may be configured to classify network destinations as trusted or untrusted based on one or more of a whitelist comprising a list of trusted network destinations or a blacklist comprising a list of untrusted network destinations.

A system (e.g., such as an internet isolation system) may include a local network, an authorization device, a border firewall, and/or a proxy device. The local network may include a first device and a second device connected thereto. The first device and/or the second device may be a host computer system, as described herein. The authorization device may be configured to receive authentication credential from an isolated computing environment implemented on the first device and/or the second device. The authorization device may be configured to authenticate the isolated computing environment(s) using the received authentication credentials. The border firewall may be configured to prevent unauthorized communication between the local network and untrusted network destinations. The border firewall may be configured to block data received for a session associated with a process operating in the isolated computing environment when the session has been terminated.

The proxy device may be configured to proxy communications between the untrusted network destinations and the isolated computing environment(s). The proxy device may be configured to receive, from an application and or process operating in the authenticated isolated computing environment of the first device, a request to communicate with an untrusted network destination. The proxy device may be configured to allow, based on the authentication of the authenticated isolated computing environment, the application or process operating in the authenticated isolated computing environment to communicate with the untrusted network destination. The proxy device may be configured to receive, from the malware on the workspace of the first device, a request to communicate with an untrusted network destination. The proxy device may be configured to prevent the malware from communicating with the untrusted network destination. The authorization device and the proxy device may be the same device.

DETAILED DESCRIPTION

Figure 1:
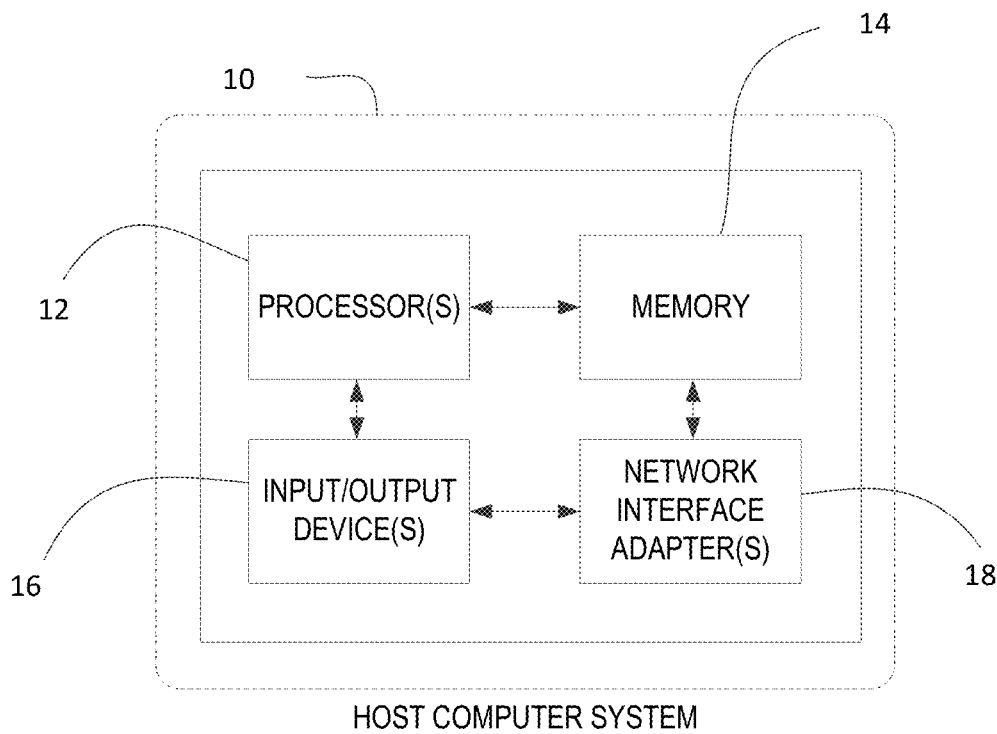
FIG. 1 illustrates an example host computer system.

Examples described herein are generally directed to providing systems and methods for preventing malware from contacting a command and control server while still providing an authorized user of computing devices access to untrusted devices, such as those available via the internet. A computing device may become infected with malicious code such as malware, often without the knowledge of an authorized user. One operation malware can perform is contacting a command and control server that is under the control of the malware author or administrator. Through the command and control server the malware is able to receive instructions and execute corresponding commands within the infected computer system. The received commands may include such nefarious actions as exfiltrating data, encrypting data in order to hold it hostage, destroying data, propagating throughout a computer system and local network, and other similar activities.

In examples, a process running on a host computer system, which may be connected to a trusted (e.g., secured) network, attempts to communicate with a particular entity. A device on the trusted network determines that the request is utilizing web-based protocols and routes the communication request to a proxy device. The proxy device may be a web proxy, an email proxy, and/or a split DNS. The proxy device may permit (e.g., only permit) communication requests received on an authenticated communication channel or communication requests that are explicitly allowed, blocking other (e.g., all other) requests. Upon determining that the communication request was received on a properly authenticated communication channel or expressly permitted, the proxy device forwards the communication request to the originally requested destination.

In examples, a process running on a host computer system, which may be connected to a trusted (e.g., secured) network, attempts to communicate with a particular entity. A device on the trusted network determines that the request is utilizing a specific service protocol such as email or DNS and routes the communication request to an intermediate device that is configured to specifically handle the service protocol. The intermediate device permits (e.g., only permits) communication requests received on the specified service protocol from predetermined devices, which generally do not include user-based computing devices unless explicitly allowed, blocking other (e.g., all other) requests.

In examples, a process running on a host computer system, which may be connected to a trusted (e.g., secured) network, attempts to communicate with a particular entity. A device on the trusted network determines that the request is utilizing non-standard or otherwise unspecified protocols and routes the communication request to a perimeter firewall (also referred to as a "border firewall") device. The perimeter firewall device permits (e.g., only permits) communication requests received from predetermined devices on predetermined ports, which generally do not include user-based computing devices unless explicitly allowed, blocking other (e.g., all other) requests.

In examples, a trusted host computer system (also referred to as simply a "host computer system") attempts to communicate with a particular entity utilizing another host computer system as an intermediate communication device, otherwise known as pivoting or lateral movement communication. Host computer systems permit (e.g., only permit) communication requests received from predetermined devices on predetermined ports, which generally do not include user-based computing devices unless explicitly allowed, blocking other (e.g., all other) requests.

Many times, when malicious users succeed in penetrating a computer network, they attempt to contact a command-and-control server in order to receive instructions and/or download additional payloads. Instructions received from a command-and-control server may include instructions to gather and exfiltrate data, instructions to destroy data, instructions to encrypt and hold data hostage, instructions to download and execute additional malware, and other similar instructions. Command-and-control servers can be particularly dangerous because oftentimes malware is able to communicate system and local network specific information to the command-and-control server. The command-and-control server is then able to provide specific payloads to the malware that are specifically selected to exploit the computer system and local network.

The examples described herein prevent such contact with an external source (e.g., a command and control server) using a variety of different techniques. For instance, the systems herein prohibit direct communication between a host computer system and untrusted network destinations, such as command-and-control servers. Various network devices and/or applications including, but not limited to, routers, firewalls and proxies block or reroute any such attempts. Moreover, the systems herein permit communication between a host computer system and untrusted network destinations via an authenticated communication channel through a proxy device when initiated or approved by a user. The authenticated communication channel, however, originates from within an isolated computing environment (e.g., a sandboxed environment), and as such, is heavily limited in what computer system resources it is able to access and manipulate.

As used herein, host computer systems include any computing device capable of executing software applications and receiving and/or transmitting network communications. Further, a host computer system may also include the operating system and software running in the operating system. Examples of host computer systems include desktop computers, laptop computers, mobile computing devices, and other similar devices. The host computer systems can be thought of additionally or alternatively as "trusted devices," or "protected, trusted devices". One will appreciate, however, that not all host computer systems can be generically considered trusted. Instead, as used herein, a trusted host computer system is deemed "trusted" by a network administrator or some similar individual. For example, a network administrator may deem a local network trusted when that local network has implemented specific security protocols that create a security layer between the local network and external networks.

The systems disclosed herein allow communication between a trusted device and untrusted network destinations via a process within an isolated computing environment (e.g., a sandbox environment) running on the trusted device. As used herein, a sandbox environment, also known as a container or sandbox herein, includes its own segregated, protected memory space. Additionally, when a host computer system is connected to a local, trusted network, perimeter (border) firewalls may block direct communication between the trusted device and untrusted network destinations. Additionally or alternatively web proxy devices may block direct communication between the trusted device and untrusted network destinations, unless certain conditions are met, for example, the use of an authenticated channel. A host-based firewall may block direct communication between the trusted device and other trusted devices (e.g. lateral movement). Moreover, an internal isolation firewall (e.g., a sandbox firewall) blocks direct communication between a sandbox environment and the remaining memory space, including the operating system, of the trusted host computer system.

Any communications into or out of the sandbox environment are governed by the sandbox firewall. The sandbox firewall can be thought of additionally or alternatively as a "software-based" firewall, meaning a firewall installed to essentially surround and govern the in/out-bound communications between the sandbox environment and the remaining memory space, including the operating system, of the trusted host system. Thus, a sandbox firewall, or software-based firewall, can be distinguished from an operating system firewall (or "host" firewall) in that the sandbox firewall is meant to regulate the sandbox environment itself.

The host firewall (also referred to herein as "host-based firewall") governs and/or serves as a barrier to activity (e.g., all activity) between any application on the host computer system and the connected network. The host firewall may be implemented using software that is, at least in some cases, commercially available, such as available from MACAFEE or SYMANTEC. The host firewall may also or alternatively be implemented using software built into the operating system of the host computer system. Additionally or alternatively, the host firewall may be implemented using software that configures and/or implements restrictive ingress and/or egress policies on the host computer system.

Examples herein may include one or more perimeter firewalls, such as a network firewall (also referred to as a "hardware-based" firewall) that governs communications between the host computer system and other computer systems on a network. In examples, the perimeter firewall is integrated with a network router. One will appreciate that the term "firewall" can be understood to include any combination of software and/or hardware components needed to execute the purposes stated herein.

Even if malware is introduced into a network, or onto a host computer system, any attempt to communicate by the malware from the host computer system's trusted environment (e.g. the environment not included within the segregated, protected memory space or sandbox environment) cannot reach an untrusted network destination.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox-based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

Figure 2:
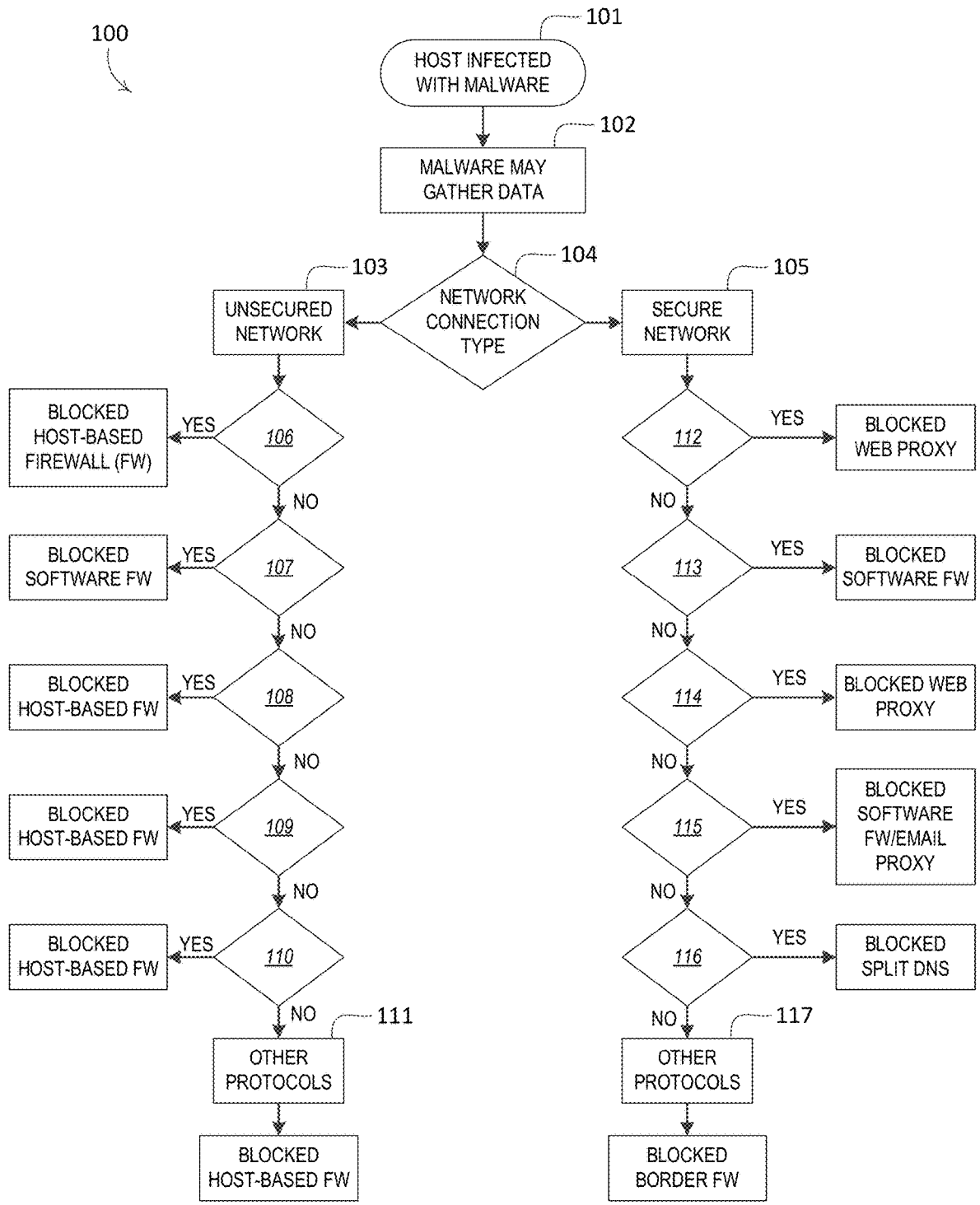
FIG. 2 illustrates a flowchart of an example method for preventing communication to a command-and-control server from a trusted or untrusted network.

FIG. 2 illustrates a method 100 in which a host computer system (e.g., host computer system 10 in FIG. 1 and/or host computer system 202 in FIGS. 3-5) is infected with malware (at 101). In examples, the malware (e.g., malware 205 in FIG. 3) has escaped the sandbox environment (e.g., isolated computing environment 204 in FIGS. 3-5) or in some other way infected the underlying operating system of the host computer system 202. The malware 205 attempts to communicate with an external source. The external source may be a remote server (e.g., a command-and-control server).

Based on the network connection type (at 104), the host computer system 202 follows one of two paths. For example, the malware 205 may make many different attempts contact a command-and-control server while the host computer system 202 is connected to an unsecure network (at 103). In examples, when the host computer system 202 is connected to an unsecure network, a host firewall (e.g., host-based firewall 207 in FIGS. 3-5) on the host computer system 202 blocks network communication (e.g., all network communication) except restricted communication from the sandbox environment. In examples, a host firewall 207 includes a software interface between the host system and external networks. The host firewall 207 is capable of allowing or prevent incoming and/or outgoing communications between the host computer system and external networks.

At 111 for example, the malware 205 attempts to contact a command and control server using a non-web-based protocol (secure shell (SSH) or server message block (SMB)) and is blocked by the host firewall. At 106, the malware 205 attempts to contact a command-and-control server using a web-based protocol (e.g., hypertext transfer protocol (http) or secure hypertext transfer protocol (https)), which is also blocked by the host firewall.

The malware 205 may attempt at 107 to contact a command-and-control server through the sandbox environment 204. In such a scenario, a sandbox firewall (e.g., internal isolation firewall 203 in FIGS. 3-5) running on the host computer system 202 blocks such attempts. The sandbox firewall 203 may be integrated into the operating system of the host computer system 202, or run as an operating system process, or run as a process within the sandbox environment 204. In examples, the sandbox firewall 203 encloses a specific process or application (e.g., the sandbox environment 204) running on the host computer system 202. As such, the sandbox firewall 203 controls communication between the sandbox environment 204 and other processes running on the host computer system 202. By blocking malware 205 attempts to communicate through the sandbox environment 204, the sandbox firewall 203 prevents the malware 205 from communicating with a command-and-control server.

Attempts to exit the host computing system using a web proxy (at 108) or via email (at 109) may similarly be blocked by the host firewall 207. Likewise, attempts at contacting a command-and-control server using domain name system (DNS) spoofing or other DNS techniques may be blocked by the host firewall 207 (at 110). Indeed, as noted above, direct communications to other networks (including the internet) are blocked by the host firewall 207. Restricted access is permitted (e.g., only permitted) from an application within a sandbox environment 204, which does not have communications with applications in other memory space, including the operating system, of the host computer system. In examples, additional access from non-sandbox memory space of the host computer system to an external network (e.g., network 201 in FIG. 3) through the host firewall 207 may be explicitly permitted, such as virtual private network (VPN) client software.

If the host computer system is connected to a secure, trusted network (at 105), the malware 205 may attempt to send outbound communications through the trusted network. As with the unsecure network (at 103), the malware 205 may try to communicate with a command and control server using a non-web-based protocol (at 117) and the attempt may be blocked by a perimeter firewall (e.g., border firewall 303 in FIGS. 4-5). In examples, a perimeter firewall (e.g., border firewall 303 in FIGS. 4-5) includes a firewall that is external to the host computer system 202 and that separates the host computer system's local network from external networks. As such, the perimeter firewall 303 controls the ability of the host computer system 202 to communicate to an external network.

In examples, attempts by the malware 205 to communicate to a command-and-control server using a web-based protocol (at 112) may be redirected by a router (e.g., router 305 in FIG. 4) to a web proxy (e.g., proxy device 304 in FIGS. 4-5) and may be blocked by the web proxy. Attempts using the sandbox environment 204 (at 113) may be blocked by the sandbox firewall. Web proxy-related attempts (at 114) may be blocked by the web proxy. Email (or email server) attempts (at 115) may be blocked by a perimeter firewall and/or email proxy (e.g., email proxy 301 in FIG. 4). DNS-related attempts (at 116) may be blocked using a split DNS system (e.g., split DNS 302 in FIG. 4). Other protocols or methods may be attempted by the malware 205 and may be similarly blocked using the perimeter firewall.

Figure 3:
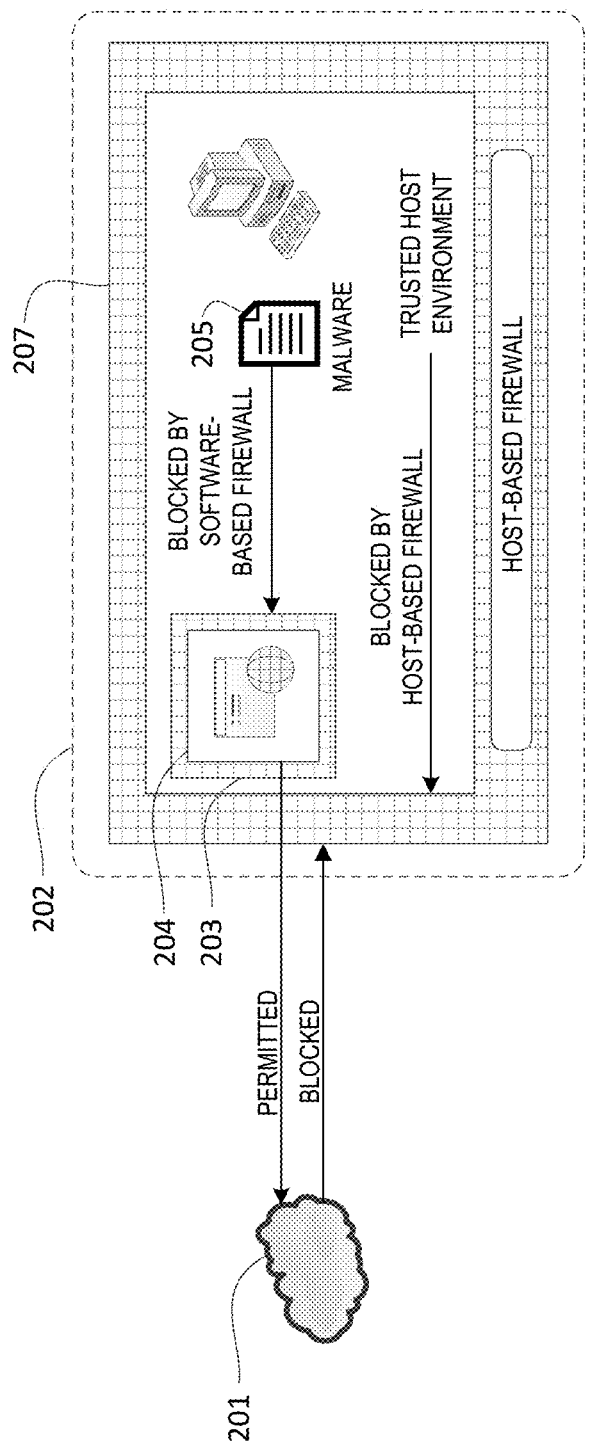
FIG. 3 illustrates an example computing environment in which communication with a command-and-control server is prevented from an untrusted network.

FIG. 3 illustrates an example host computer system 202 attempting to access an untrusted network 201 (e.g., home, internet café, Starbucks or other commercial network, the internet). For example, a user may take a host computer system 202 home or on a business trip. Advanced malware 205 may be designed to wait for the host computer to be removed from a trusted network before it attempts to communicate with a command-and-control server. Using traditional defensive systems, such a communication link would be difficult to detect and stop, as the malware 205 may disguise the communications to appear as ordinary web traffic. Outbound communications are tightly controlled, especially web traffic intended for untrusted network destinations. Such outbound traffic is allowed (e.g., only allowed) to originate from within the sandbox environment 204. As explained above, the sandbox firewall 203 prevents processes operating outside of the sandbox environment 204 from injecting data into the sandbox environment 204 for communication to a command-and-control server.

The attempt to access untrusted network 201 illustrated in FIG. 3 may be made by a user via a web browser application or by another application. The host computer system 202 detects this request for communication and determines that the entity to which the request is to be sent is an untrusted entity. If the communication originates from within the sandbox environment 204, the sandbox firewall 203 and host firewall 207 allows the communication to be sent to the untrusted network 201. In contrast, any communications that originate outside of the sandbox environment 204 are blocked by the host firewall 207.

The only direct communication allowed may be from the sandbox environments 204 of the host computer system 202 to the untrusted network 201. Because the sandbox environment 204 is executed within segregated memory, processes within the sandbox environment 204 do not have access to data stored in other memory space or other system resources, including the operating system of the host computer system 202. As such, communications from within the sandbox environment 204 are incapable of exfiltrating data, executing payloads outside the sandbox environment, or otherwise impacting the computer system or local network. Further, as explained above, the sandbox firewall 203 prevents processes (e.g., malware 205) external to the sandbox environment 204 from injecting data and communicating through the sandbox environment 204.

As shown in FIG. 3, other attempts at communicating outside of the host computer system 202 are also stopped. Attempts by the host computer system 202 are blocked by a host firewall 207, as are incoming attempts from the untrusted network 201. Attempts by malware 205 to communicate with a command-and-control server through the sandbox environment 204 are stopped by a sandbox firewall 203. Accordingly, no matter how the malware 205 attempts to communicate with a command-and-control server from the host computer system 202, each attempt is blocked. As such, the type or amount of data and the ability to execute malware payloads that the malware 205 has accessed is irrelevant, as it cannot contact a command-and-control server out of the host computer system 202.

Figure 4:
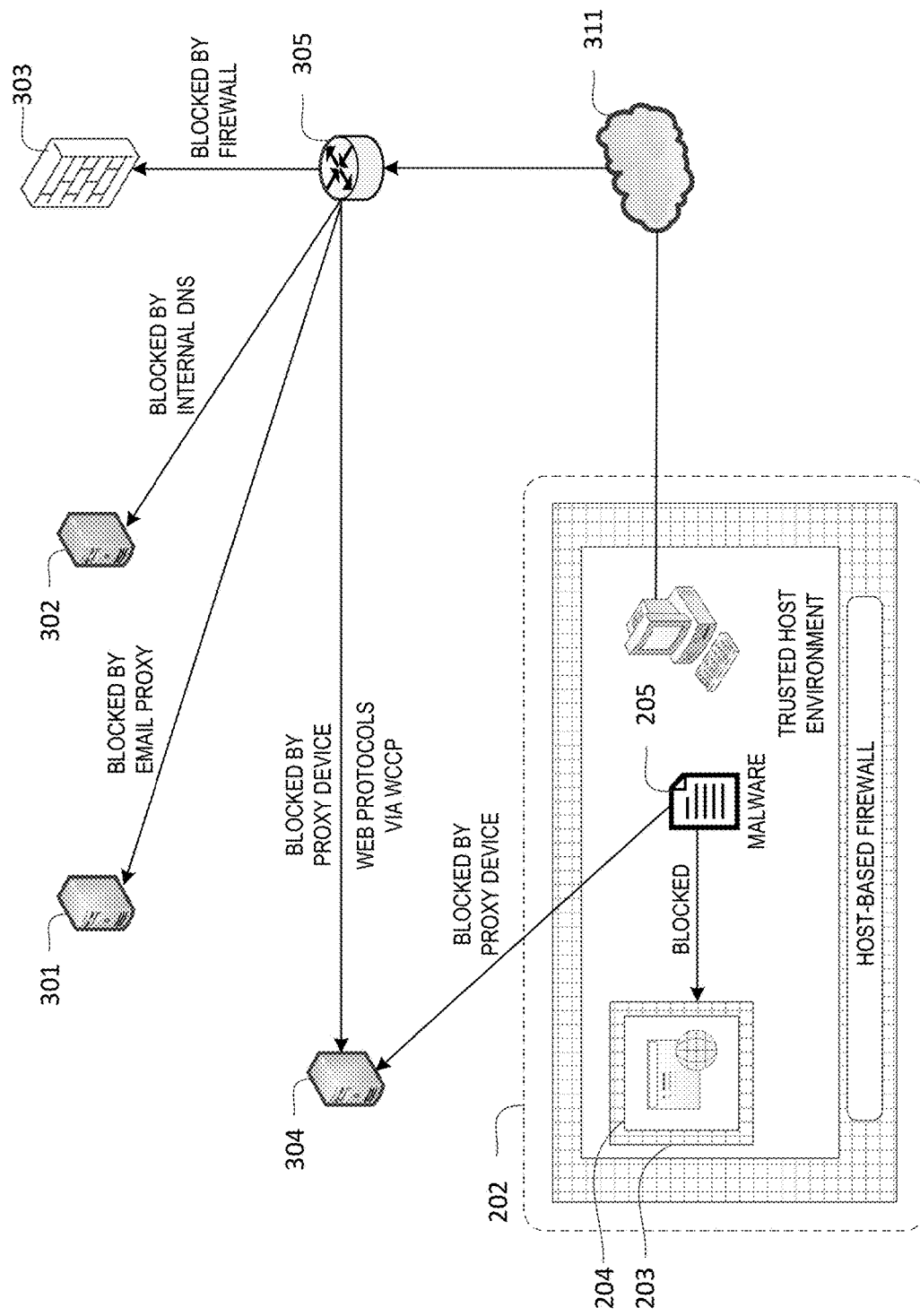
FIG. 4 illustrates an example computing architecture in which communication to a command-and-control server is prevented from a trusted network.

FIG. 4 depicts an example command-and-control server protection system when the host computer system 202 is in communication with a trusted network. In examples, within a trusted network 311, a web proxy 304 (e.g., a proxy device) is used to block attempts to exit the network or to contact a command and control server. In examples, the host computer system 202 may not have a host-based firewall (e.g., such as the host firewall 207 shown in FIG. 3) that is actively blocking out-bound communications. Instead, the host computer system 202 may be able to freely communicate to computer resources within the host-based computer's trusted network 311.

The malware 205 may attempt to exit the network through the web proxy 304. However, the web proxy 304 may be configured to accept (e.g., only accept) communication requests that are properly authenticated. For example, the web proxy 304 may be configured to receive outbound web traffic requests on port 1234. The web proxy 304 may be further configured to accept (e.g., only accept) web traffic from cryptographically authenticated processes, such as the sandbox environments 204. In examples, the authentication mechanism between the web proxy 304 and the sandbox environment 204 utilizes a public-private key encryption or a pre-shared key encryption such that the communication channel between the sandbox environment 204 and the web proxy 304 is encrypted within the local trusted network 311. Such a configuration may prevent malware 205 from stealing authentication credentials and exiting through the web proxy 304.

If the malware 205 on the host computer system 202 attempts to directly communicate with an external network using web-based protocols, a local router 305 forwards the communication attempt to the web proxy 304 on a port other than that used by the sandbox environment 204, for example port 4321. Because the communication attempt is not authenticated, not received on the expected port (e.g., port 1234), or otherwise explicitly allowed, the web proxy 304 drops the communication attempt and the malware 205 is prevented from communicating with a command-and-control server. Similarly, if the malware 205 attempts to communicate to an external network using a non-web-based communication protocol, the local router 305 forwards the communication to the firewall 303 where it is blocked.

Security of a host computer system 202 is increased with no method to communicate with untrusted network destinations without user interaction. Direct communication attempts using DNS are blocked using a split DNS system 302. Direct access attempts through email are routed by internal router 305 to email proxy 301, which requires proper authentication credentials that the malware 205 will not have. Other attempts are routed by router 305 to the web proxy 304 or perimeter firewall 303 where they are dropped. Network traffic flows related to routed communication attempts to the web proxy 304 by the router 305 may be handled using the web cache communication protocol (WCCP) or using other protocols. Any direct communication attempts between the host computer system 202 and another trusted device are blocked by an inbound and/or outbound host firewall 207 on either or both host computer systems, thereby preventing lateral movement of malware 205 between trusted devices.

The host computer system 202 may instantiate a sandbox firewall 203 in relation to a sandbox environment 204. Any communications into and out of the sandbox environment 204 are regulated by the sandbox firewall 203. Assuming the sandbox environment 204 will eventually contract malware 205 and become compromised, the sandbox firewall 203 is designed to look for requests to access resources outside of the isolated memory space of the sandbox environment of the host computer system 202. The sandbox firewall 203 will determine that the request was received from the sandbox environment 204 and not user initiated and/or user approved and will block the request. As such, the sandbox firewall 203 blocks access between the sandbox environment 204 and other memory space, including the operating system, of the host computer system. This prevents the malware's ability to spread from a sandbox environment 204 to a host computer system's main operating environment.

As noted herein, even if the malware 205 were to reach the host computer system's operating system, any attempts to communicate with a command and control server (whether on a trusted network or on an untrusted network) would be blocked by the sandbox firewall 203, the email proxy 301, the split DNS 302, the border firewall 303, the web proxy 304 or by the host firewall 207. Accordingly, communication to a command-and-control server from such a system is extremely difficult and highly unlikely.

Figure 5:
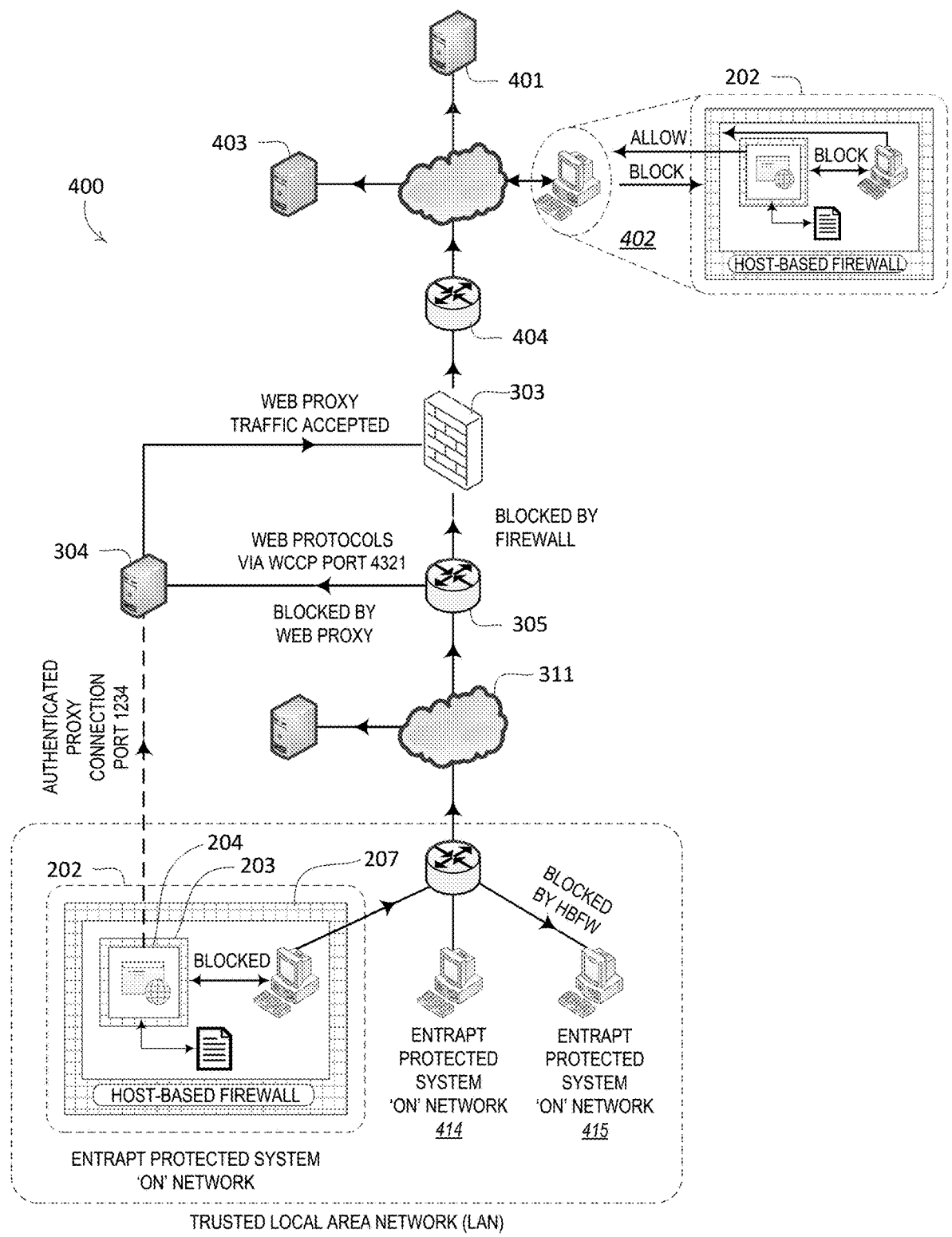
FIG. 5 illustrates another example computer architecture in which communication to a command-and-control server is prevented from a trusted network.

FIG. 5 illustrates an example resilient network architecture which protects against internet-based attacks, utilizing many security features. As noted above, at least one of these security features includes a sandbox environment 204 (e.g., an isolated computing environment) that uses a sandbox firewall 203 (e.g., an internal isolation firewall). The sandbox environment 204 authenticates with a proxy device (e.g., such as web proxy 304). The web proxy 304 prevents access (e.g., all access) to the open internet, except through an authenticated web proxy session or as explicitly permitted. Moreover, internet access may be permitted (e.g., only permitted) through the web proxy 304 when the communication is initiated within a sandbox environment 204 by a process such as a browser. If requests come to the web proxy 304 that are not properly authenticated, or are not explicitly permitted, e.g. whitelisted, the request will be denied.

The host computer system 202 may be location-aware. As such, the host computer system 202 may determine when it is on a protected or trusted network (e.g., at 311), and when it is on an untrusted network (e.g., at 402). When the host computer system 202 is on an untrusted network 402, sandboxed browsing (e.g., only sandboxed browsing) is permitted. Moreover, firewall protection is increased. Even when the host computer system 202 is on a trusted network 311, the host computer system 202 may be prevented from openly communicating with other computer systems such as 414 and 415 by a host firewall 207.

The host computer system 202 may be allowed or prevented from communicating with server 401 or 403 through trusted network 311. If, for example, a user or malicious program tries to communicate out to the internet through the trusted network 311, the request will be blocked by the perimeter firewall 303 or will be rerouted by the router 305 to the web proxy 304 in the case of web-based protocols, where the request will be dropped if not explicitly permitted. Authenticated requests sent from a sandbox environment 204 may be sent through the web proxy 304 to the perimeter firewall 303 or border router 404 where they are routed to untrusted servers (e.g., 403).

The example resilient network architecture shown in FIG. 5 may provide multiple benefits including a seamless experience for users, easy integration into existing security systems, immediate protection from internet-based attacks, the opportunity to reallocate labor resources for new projects and security initiatives, and/or enhanced and simplified network monitoring by removing several layers of internet traffic. The perimeter firewalls 303 are configured to allow (e.g., only allow) internet access via the web proxy 304 or traffic from other predetermined trusted devices on predetermined ports. Access to the internet from other (e.g., all other) devices is automatically dropped.

Externally bound web protocols from internal hosts are automatically directed to the web proxy 304 on a specific port, such as 4321. In some cases, the location of this "redirection" is a router 305 just prior to the perimeter firewall 303. Traffic received by the web proxy 304 on this port is automatically dropped unless explicitly permitted. Thus, within the network, internet traffic is limited to a single outlet, greatly reducing the amount of overall traffic, leading to a much quieter network that is easier to maintain and monitor. Moreover, requests that appear out of the ordinary are easy to identify and stop, as they likely come from a malicious or unknown program.

Access to the internet via the web proxy 304 requires encrypted authentication credentials unless explicitly permitted, to which malware 205 programs would not have access. Utilization of the web proxy 304 to gain internet access may be provided via a secondary port, such as 4321. Improperly (e.g., all improperly) authenticated or unauthenticated traffic received would be automatically dropped. Authenticated access to the web proxy 304 is available (e.g., only available) using an application within a sandbox environment 204. Encrypted authentication credentials may be stored locally in further encrypted configuration files. These encrypted configuration files that store the encrypted authentication credentials are loaded on startup or restart of the sandbox environment 204. The sandbox firewall 203 allows specific, user prompted actions to transfer data between the trusted environment and the segregated memory associated with the sandbox environment 204. Other (e.g., all other) connectivity between these environments is blocked.

By being location aware, a host computer system 202 may determine whether it is connected to a secured network (e.g., on network) or connected to an "unprotected" network (e.g., off network). The host firewall 207 run on the host computer system 202 permits browser traffic originating from the sandbox environment 204 to exit the host computer system 202 when off network. The host firewall 207 may also permit authorized virtual private network (VPN) clients to exit the host computer system 202 when off network. The host firewall 207 drops other (e.g., all other) traffic including malware 205 trying to exit the host computer system 202 when off network.

The sandbox firewall 203 may be configured to automatically create a browser process within a sandbox environment 204. The sandbox firewall 203 automatically creates a browser process within the sandbox environment 204 for destinations (e.g., all destinations) considered "untrusted". The sandbox firewall 203 may also be configured to automatically create a browser process within trusted memory (e.g., outside of the sandbox environment 204) on the host computer system 202 for destinations (e.g., all destinations) considered "trusted".

When a sandbox environment 204 is compromised, the sandbox environment 204 may be reverted to a known good image, thereby removing any malware 205 a malicious user may have added. This may happen on a periodic basis (e.g., daily), by user request, or by detection of the sandbox environment 204 operating in an unexpected or unusual manner. As such, any adversary would need to re-enter the malware 205 into the sandbox environment 204. Any attempts by an attacker at lateral movement are prevented by a host firewall 207 that refuses incoming (e.g., all incoming) connections, except traffic from predetermined devices using predetermined ports. The malware 205 may attempt to exit through the web proxy 304 or directly through the perimeter firewall 303, but traffic (e.g., all traffic) is dropped from internal hosts, except for traffic from predetermined devices using predetermined ports. A remaining (e.g., the only remaining) path is to exit through a sandbox environment 204, but the sandbox firewall 203 refuses connection (e.g., all connections) from the host computer system 202.

Location-aware laptops, tablets, and/or other mobile devices may be protected both on and off the network. Different security levels may automatically be created utilizing different security policies based on the network the host computer system 202 is connected. Should an attacker gain access to a host, armed with malware 205 designed to wait for an unfiltered internet connection, the host firewall 207 will still block the malware 205 from connecting to the internet, hence protecting the data. Users are still able to surf the internet through the sandbox environment 204. On occasions where a direct internet connection is required, a whitelist exception process may allow for such a connection. However, even these types of access may be tightened using configurable access controls. For instance, an administrator may limit the access to a third or fourth level domain, limit the address to the employees who require it, and/or add a user agent string so only that person or application has access.

The examples described herein may be implemented on various types of host computer systems 202. As noted above, these host computer systems 202 may, for example, be mobile phones, electronic appliances, laptop computers, tablet computers, wearable devices, desktop computers, mainframes, and the like. As used herein, the term "host computer system" includes any device, system, or combination thereof that includes at least one processor, and a physical and tangible computer readable memory capable of having thereon computer-executable instructions that are executable by the processor. The processor may be one of many processors in a distributed computing system or cloud-based computing system. The host computer system may also establish virtual systems including virtual operating systems that run on a host device or in a cloud-based system. In examples, an Internet Service Provider (ISP) or some similar entity may provide some or all of the services described herein to its end users. For example, the Internet Service Provider may provide a web proxy through which its users may send authenticated network traffic. Unauthenticated traffic, unless expressly whitelisted, is then block by the ISP. As such, a cloud-based solution is available to users who do not have the resources to install their own web proxy and routers. A computing system may be distributed over a network environment and may include multiple constituent computing systems (e.g., a cloud computing environment). In a cloud computing environment, program modules may be located in both local and remote memory storage devices.

As described herein, a computing system may also include communication channels that allow the computing system to communicate with other message processors over a wired or wireless network. Such communication channels may include hardware-based receivers, transmitters or transceivers, which are configured to receive data, transmit data or perform both. Examples described herein also include physical computer-readable media for carrying or storing computer-executable instructions and/or data structures. Such computer-readable media may be any available physical media that may be accessed by a general-purpose or special-purpose computing system.

System architectures described herein may include a plurality of independent components that each contribute to the functionality of the system as a whole. This modularity allows for increased flexibility when approaching issues of platform scalability and, to this end, provides a variety of advantages. System complexity and growth may be managed more easily through the use of smaller-scale parts with limited functional scope. Platform fault tolerance is enhanced through the use of these loosely coupled modules. Individual components may be grown incrementally as business needs dictate. Modular development also translates to decreased time to market for new functionality. New functionality may be added or subtracted without impacting the core system.

Accordingly, methods, systems and computer program products are provided which prevent exfiltration of data from a network. The concepts and features described herein may be embodied in other specific forms without departing from their spirit or descriptive characteristics. The described examples are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A first computer system, wherein the first computer system comprises:
   a processor configured to:
   implement a workspace, wherein the workspace is configured to use a first memory space and is configured to enable operation of a first set of one or more applications or processes;
   implement an isolated computing environment, wherein the isolated computing environment is configured to use a second memory space and is configured to enable operation of a second set of one or more applications or processes;
   implement an internal isolation firewall to isolate the second memory space used by the isolated computing environment from the first memory space used by the workspace, wherein the internal isolation firewall is configured to the workspace from injecting data into the isolated computing environment when it is determined that the workspace is infected with malware;
   implement a first host-based firewall that prevents the malware from receiving communication from a network when it is determined that the workspace is infected with the malware; and
   send a message to a second computer system, wherein the message includes a firewall configuration, wherein the firewall configuration configures a second host-based firewall to prevent the second computer system from being infected by the malware.

2. The first computer system of claim 1, wherein the communication comprises one or more of instructions to gather data, instructions to exfiltrate data, instructions to destroy data, instructions to encrypt data, instructions to download additional malware, or instructions to execute the malware.

3. The first computer system of claim 1, further comprising one or more mechanisms that are configured to prevent the malware from establishing a command channel with the network.

4. The first computer system of claim 3, wherein the one or more mechanisms comprise the processor being configured to communicate through one or more of a border firewall or a proxy device.

5. The first computer system of claim 1, wherein the internal isolation firewall is configured to prevent the malware from communicating with the network via the isolated computing environment.

6. The first computer system of claim 1, wherein the isolated computing environment is a sandboxed computing environment enforced by a sandbox container process that enables the internal isolation firewall.

7. The first computer system of claim 1, wherein the processor is further configured to terminate a browser process operating in the isolated computing environment upon expiration of a predetermined amount of time without receiving or sending data.

8. The first computer system of claim 1, wherein the processor is further configured to classify network destinations as trusted or untrusted based on one or more of a whitelist comprising a list of trusted network destinations or a blacklist comprising a list of untrusted network destinations.

\* \* \* \* \*